United States Patent
Saito

(10) Patent No.: US 8,320,483 B2
(45) Date of Patent: Nov. 27, 2012

(54) RADIO TRANSMISSION APPARATUS, RADIO RECEPTION APPARATUS, RADIO TRANSMISSION-RECEPTION SYSTEM, AND METHOD THEREOF

(75) Inventor: Naoyuki Saito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 422 days.

(21) Appl. No.: 12/776,930

(22) Filed: May 10, 2010

(65) Prior Publication Data

US 2010/0284479 A1 Nov. 11, 2010

Related U.S. Application Data

(63) Continuation of application No. PCT/JP2007/001310, filed on Nov. 28, 2007.

(51) Int. Cl.
H04K 1/10 (2006.01)
H04L 27/28 (2006.01)

(52) U.S. Cl. ........ 375/260; 375/141; 375/146; 375/343; 375/346; 375/142; 370/208; 370/310; 370/335; 370/342

(58) Field of Classification Search .................. 375/260, 375/140, 142, 146, 147, 150, 343, 346, 141; 370/208, 310, 335, 342
See application file for complete search history.

(56) References Cited

U.S. PATENT DOCUMENTS

| | | | |
|---|---|---|---|
| 2003/0016731 A1 | 1/2003 | Uesugi | |
| 2003/0081538 A1 | 5/2003 | Walton et al. | |
| 2005/0185725 A1 | 8/2005 | Maeda et al. | |
| 2005/0259567 A1* | 11/2005 | Webster et al. | 370/208 |
| 2006/0067278 A1 | 3/2006 | Li et al. | |
| 2006/0099925 A1* | 5/2006 | Tsai et al. | 455/272 |
| 2007/0010226 A1* | 1/2007 | Laroia et al. | 455/296 |
| 2008/0049851 A1* | 2/2008 | Nangia et al. | 375/260 |
| 2008/0192622 A1* | 8/2008 | Scheim et al. | 370/210 |
| 2012/0106513 A1* | 5/2012 | Li et al. | 370/331 |

FOREIGN PATENT DOCUMENTS

| | | |
|---|---|---|
| JP | 07245574 | 9/1995 |
| JP | 09233047 | 9/1997 |
| JP | 2001156744 | 6/2001 |
| JP | 2001203664 | 7/2001 |
| JP | 2003234789 | 8/2003 |
| JP | 2004527166 | 9/2004 |

(Continued)

OTHER PUBLICATIONS

Notification of Reason for Rejection Japanese Office Action dated Mar. 6, 2012 received in Japanese Patent Application No. 2009-543584.

(Continued)

Primary Examiner — Phuong Phu
(74) Attorney, Agent, or Firm — Murphy & King, P.C.

(57) ABSTRACT

A radio transmission apparatus for transmitting a first radio signal and a second radio signal with different communication system, the apparatus includes: a first transmission unit which generates the first radio signal on the basis of a first communication system and transmits the first radio signal; a diffusion processing unit which performs diffusion processing of data allocated to DC subcarrier on the basis of the first communication system, and generate a diffusion signal; an addition unit which adds the diffusion signal and a signal obtained by orthogonal frequency division multiplex processing; and a second transmission unit which transmits the added signal as the second radio signal.

12 Claims, 8 Drawing Sheets

FOREIGN PATENT DOCUMENTS

| | | |
|---|---|---|
| JP | 2005176012 | 6/2005 |
| JP | 2005244960 | 9/2005 |
| JP | 2005537691 | 12/2005 |
| WO | 0169825 A1 | 9/2001 |

OTHER PUBLICATIONS

International Search Report dated Feb. 26, 2008 in corresponding International Application No. PCT/JP2007/001310.

* cited by examiner

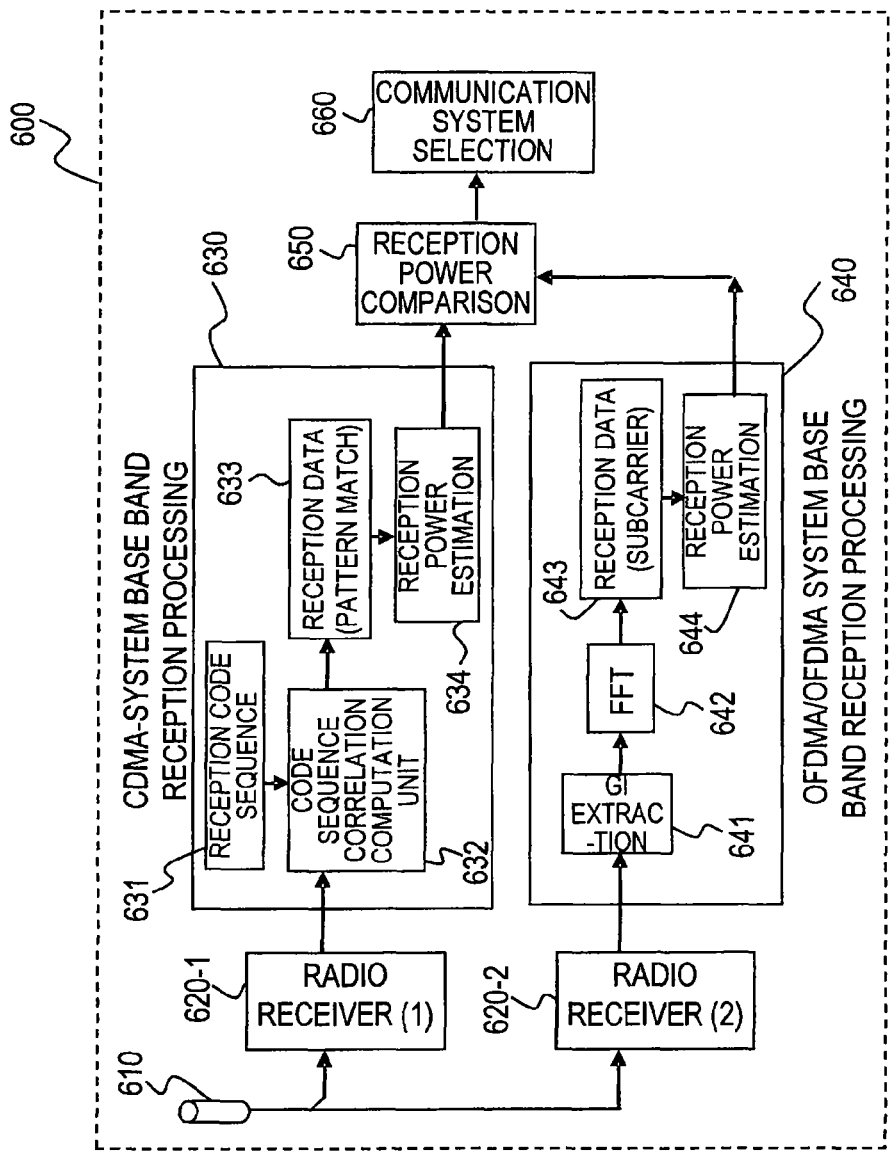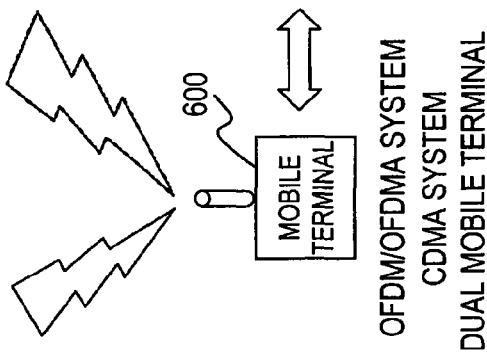
FIG. 2

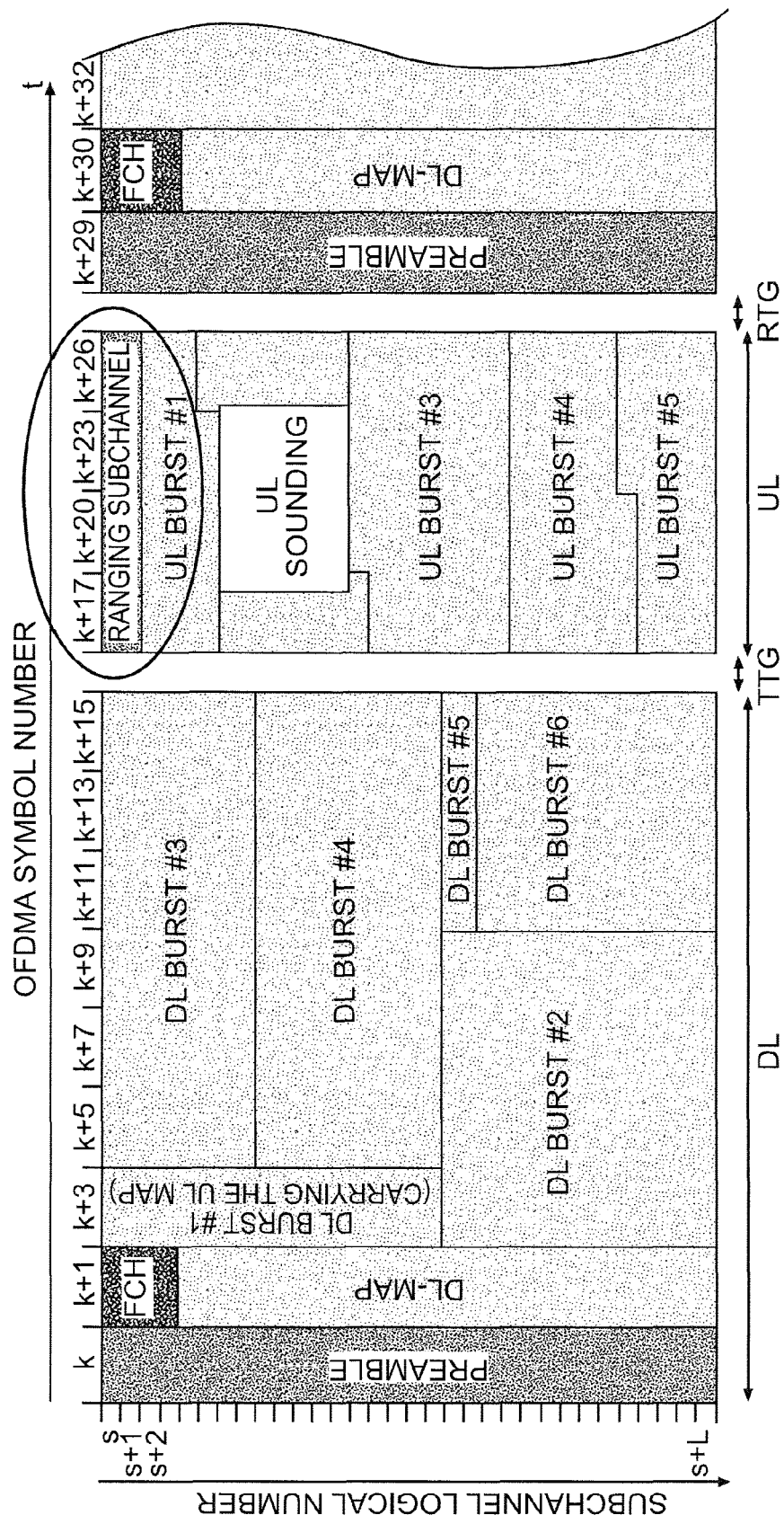

RADIO TRANSMISSION APPARATUS, RADIO RECEPTION APPARATUS, RADIO TRANSMISSION-RECEPTION SYSTEM, AND METHOD THEREOF

CROSS-REFERENCE TO RELATED APPLICATIONS

This application is a continuation of international application PCT/JP2007/001310, filed on Nov. 28, 2007, the entire contents of which are incorporated herein by reference.

FIELD

The embodiments discussed herein are related to a radio transmission apparatus, radio reception apparatus, radio transmission-reception system, and method thereof.

BACKGROUND

At present, there is a CDMA (Code Division Multiplex Access) system or an OFDM (Orthogonal Frequency Division Multiplex)/OFDMA (Orthogonal Frequency Divisional Multiplex Access) system as a radio communication system.

Further, there is also a radio communication system combining the CDMA system and the OFDMA system, in which diffusion processing is performed by an input signal and then a subcarrier is allocated to the diffusion processed signal (see, for example, Patent Documents 1 to 4).

Patent Document 1: Japanese Laid-Open Patent Publication No. 2005-176012.
Patent Document 2: Japanese National Publication of International Application No. 2005-5379691.
Patent Document 3: Japanese Laid-Open Publication No. 2001-203664.
Patent Document 4: Japanese Laid-Open Publication No. 2001-156744.

However, in the dual communication service, for example a service such as two radio communication systems including the CDMA and OFDMA system, a terminal receiving the service may select one service which is preferred for reception from among two communication services. In this case, the terminal may measure reception state of two communication services. Therefore, the terminal may perform reception processing by two communication services independently and in parallel. As a result, the terminal consumes a large amount of power.

Further, in the dual communication service, there is a problem that how much a lot of user data is transmitted in allocated frequency region.

SUMMARY

According to an aspect of the invention, a radio transmission apparatus for transmitting a first radio signal and a second radio signal with different communication system, the apparatus includes: a first transmission unit which generates the first radio signal on the basis of a first communication system and transmits the first radio signal; a diffusion processing unit which performs diffusion processing of data allocated to DC subcarrier on the basis of the first communication system, and generate a diffusion signal; an addition unit which adds the diffusion signal and a signal obtained by orthogonal frequency division multiplex processing; and a second transmission unit which transmits the added signal as the second radio signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 illustrates a configuration example of a radio reception apparatus.
FIG. 7B is an example of subchannel.

DESCRIPTION OF EMBODIMENTS

The best mode for carrying out the invention will be described below.

First Embodiment

Figure 1:
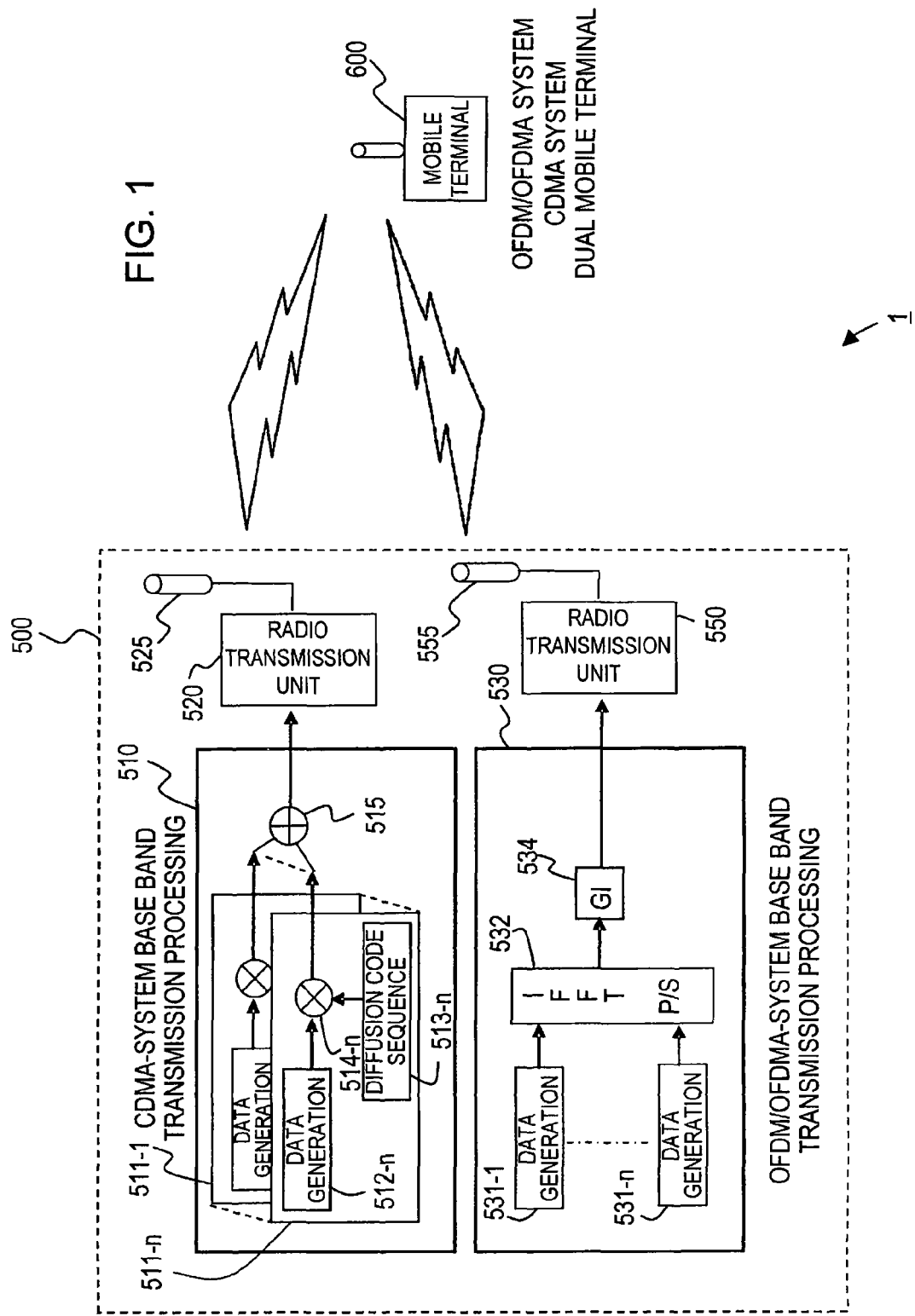
FIG. 1 illustrates a configuration example of a radio communication system.

FIG. 1 illustrates a configuration example of a radio transmission and reception system 1. In particular, FIG. 1 illustrates a configuration reception example of a radio transmission apparatus 500. The radio transmission and reception system 1 includes the radio transmission apparatus 500 and a radio reception apparatus 600. For example, the radio transmission apparatus 500 is base station and the radio reception apparatus 600 is an information terminal such as a cellular phone, a PDA, or a personal computer.

The radio transmission apparatus 500 includes a CDMA system base band transmission processing unit (referred to hereinbelow as a first transmission processing unit) 510, a first radio transmission unit 520, a first transmission antenna 525, an OFDM/OFDMA system base band transmission processing unit (referred to hereinbelow as a second transmission processing unit) 530, a second radio transmission unit 550, and a second transmission antenna 555.

Further, the first transmission processing unit 510 includes a first to n-th (integer satisfying the condition n≧1) diffusion processing units 511-1 to 511-*n* and an addition unit 515. Each of the first to n-th diffusion processing units 511-1 to 511-*n* includes data generating units 512-1 to 512-*n*, diffusion code sequence generating units 513-1 to 513-*n*, and multiplication units 514-1 to 514-*n*.

The data generating units 512-1 to 512-*n* perform modulation with respect to information signal or the like, and output the modulated signal to the multiplication units 514-1 to 514-*n*. The diffusion code sequence garneting units 513-1 to 513-*n* generate inherent diffusion code sequences (orthogonal code or PN signal, or the like) and output the inherent diffusion code sequences to the multiplication units 514-1 to 514-*n*.

The multiplication units 514-1 to 514-*n* multiply the signals from the data generating units 512-1 to 512-*n* by the diffusion code sequence from the diffusion code sequences generating units 513-1 to 513-*n*, and outputs diffusion signals.

The addition unit 515 adds up (multiplicity) the n diffusion signal outputted from each of the diffusion processing units 511-1 to 511-n. The signal obtained by the addition is outputted from the first transmission processing unit 510 as a CDMA signal.

The first radio transmission unit 520 performs the D/A conversion with respect to the CDMA signal and converts the CDMA signal into a radio transmission signal. The converted radio transmission signal is outputted from the first transmission antenna 525.

A code division multiplex processing is performed by a multiplication processing by the multiplication units 514-1 to 514-n and an addition processing by the addition unit 515.

On the other hand, the second transmission processing unit 530 includes data generating units 531-1 to 531-n, an IFFT (Inverse Fast Fourier Transform) unit 531, and a GA (Guard Interval) unit 534.

Each of the data generating units 531-1 to 531-n performs modulation with respect to information signal and outputs the modulated signal to the IFFT unit 532. The IFFT unit 532 performs inverse fast Fourier transform with respect to the signals outputted from the data generating units 531-1 to 531-n, and thereby converts data sub-carrier in the frequency region into a sample signal to the time axis direction.

The GI unit 534 copies the sample signal inverted by the inverse Fourier transform to a guard sector, and thereby inserts a guard band into the sample signal. The signal of the OFDM/OFDMA system is outputted from the second transmission processing unit 530. An orthogonal frequency division multiplex processing is performed by the IFFT unit 532.

The OFDM/OFDMA signal outputted from the second transmission processing unit 530 is converted by the second radio transmission unit 550 in radio transmission signal and the radio transmission signal is output from the second transmission antenna 555.

Figure 5:
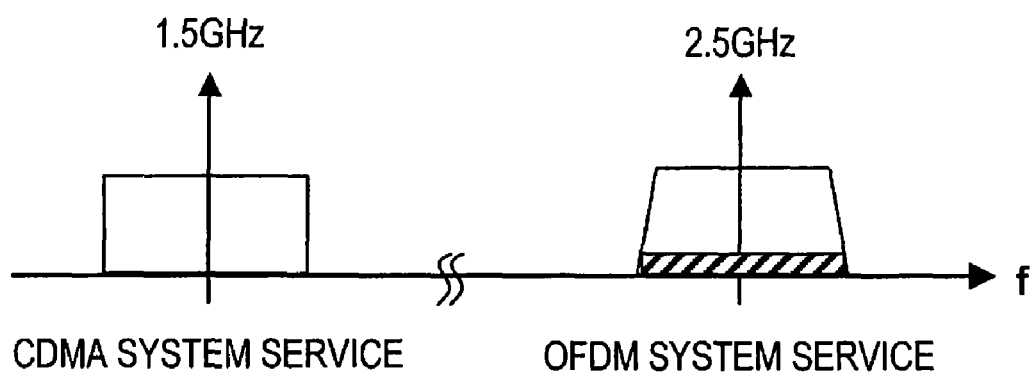
FIG. 5 illustrates a signal row that will be transmitted.

The radio transmission apparatus 500 transmits the CDMA-system radio signal and OFDM/OFDMA-system radio signal to the terminal 600. For example, as illustrated in FIG. 5, a communication service of the CDMA system with a central frequency of 1.5 GHz and a communication service of the OFDMA system with a central frequency of 2.5 GHz are provided in parallel to the terminal 600.

FIG. 2 illustrates a configuration example of the radio reception apparatus 600. The radio reception apparatus 600 includes a reception antenna 610, a first and second radio receivers 620-1, 620-2, a CDMA-system base band reception processing unit (referred to hereinbelow as a first reception processing unit) 630, a OFDM/OFDMA system base band reception processing unit (referred to hereinbelow as a second reception processing unit) 640, a reception power comparison unit 650, and a communication system selection unit 660.

The first reception processing unit 630 includes a reception code sequence generating unit 631, a code sequence correlation computation unit 632, a pattern matching unit 633, and a reception power estimation unit 634. The second reception processing unit 640 includes a GI extraction unit 641, a FFT (Fast Fourier Transfer) unit 642, a reception data processing unit 643, and a reception power estimation unit 644.

The reception antenna 610 outputs a CDMA-system reception signal to the first radio receiver 620-1 and outputs an OFDM/OFDMA-system reception signal to the second radio reception unit 620-2, by performing a processing, for example band restriction or the like, with respect to the two communication services provided in different frequency bands.

The reception code sequence generating unit 631 generates the inherent code sequence identical to the diffusion code used in the diffusion code sequence garneting units 513-1 to 513-n. The code sequence correlation computation unit 632 performs correlation detection with respect to the CDMA system reception signal by using the code sequence outputted from the reception code sequence generating unit 631.

The pattern matching unit 633 performs pattern matching with respect to the reception signal obtained after correlation detection, and the reception power estimation unit 634 estimates (or measures) reception value. The estimated reception power value is outputted to the reception power comparison unit 650.

An inverse diffusion processing with respect to the CDMA system signal is performed by the code sequence correlation computation unit 632 and pattern matching unit 633.

On the other hand, the GI extraction unit 641 extracts guard interval, and the FFT unit 642 performs fast Fourier transform, with respect to the reception signal of the OFDM/OFDMA system. And reception data transmitted by the sub-carrier are obtained.

The reception data processing unit 644 performs S/P conversion or the like, with respect to the reception data, and outputs to the reception power estimation unit 644. The reception power estimation unit 644 estimates reception power of the reception signal of the OFDM/OFDMA system by using a pilot signal and a signal of a preamble portion from among the reception data. The estimated reception power signal is outputted to the reception power comparison unit 650.

The reception power comparison unit 650 compares the power value of the reception signal of the CDMA system with the power value of the reception signal of the OFDM/OFDMA system, determines which of the signals is larger, and outputs the result to the communication system selection unit 660. The communication system selection unit 660 selects any one communication system from among the CDMA system and OFDM/OFDMA system on the basis of the output result of the reception power comparison unit 650.

The radio reception apparatus 600 then performs processing by using the reception signal based on the selected communication service.

Thus, in the first embodiment, the terminal 600 which is the radio reception apparatus performs the reception processing independently and in parallel and selects the communication service on the basis of individual reception power. As above described, the communication service is switched correspondingly to the reception environment (in the above described example, the reception power, but also may be power sensitivity or the like), thus a seamless radio communication service can be provided. In the future, a transition to the radio communication service using the OFDM/OFDMA system can be foreseen. Therefore, a spread of the radio transmission apparatus or the radio reception apparatus which can switch between a presently available service such as the CDMA system and a novel service such as the OFDM/OFDMA system can be predicted.

Second Embodiment

Figure 3:
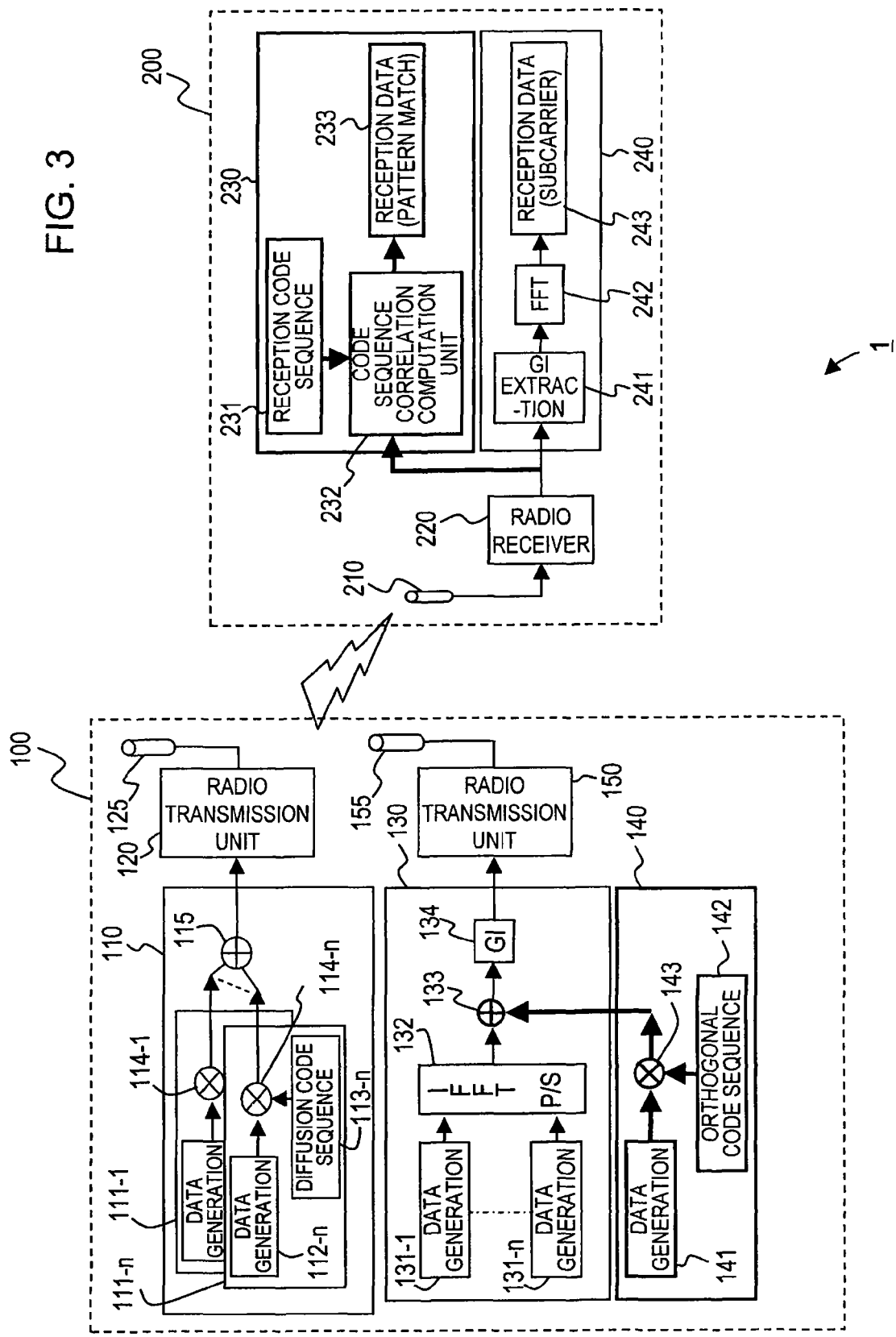
FIG. 3 illustrates a configuration example of a radio communication system.

The second embodiment is described below. FIG. 3 is a configuration diagram of the radio communication system 1. In particular, this figure illustrates a configuration diagram of a radio transmission apparatus 100 and a radio reception apparatus 200. Similarly to the first embodiment, the radio transmission apparatus 100 is, for example, the radio base station and the radio reception apparatus 200 is the information terminal.

Similarly to the radio transmission apparatus 500 (see FIG. 1), the radio transmission apparatus 100 includes a first radio processing unit 110, a first radio transmission unit 120, a first transmission antenna 125, a second transmission processing unit 130, a second radio transmission unit 150, and a second transmission antenna 155. The radio transmission apparatus 100 further includes a DC subcarrier diffusion processing unit 140, and the second transmission processing unit 130 includes an addition unit 133.

The DC subcarrier diffusion processing unit 140 includes a data generating unit 141, an orthogonal code sequence generating unit 142, and a multiplication unit 143.

Figure 4A:
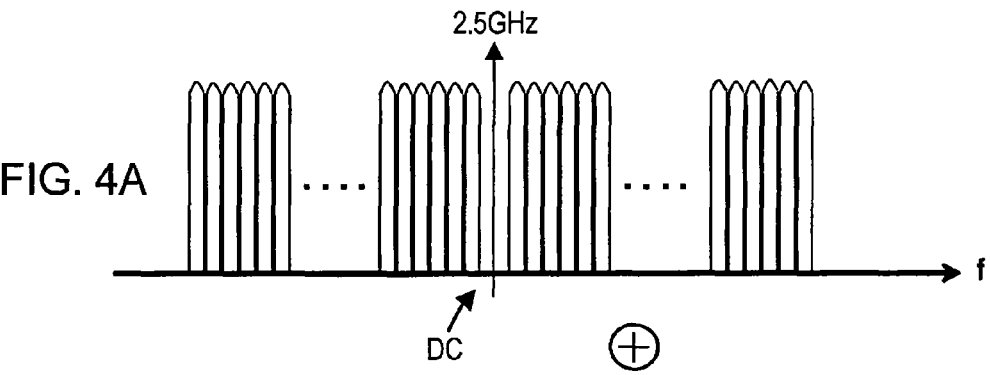
FIGS. 4A to 4D illustrate examples of signal rows.
Figure 4B:
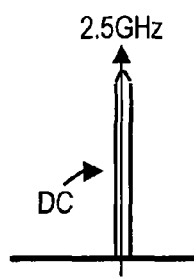

The data generating unit 141 generates a DC subcarrier data in which information signal is located in the DC subcarrier. FIG. 4B illustrates an example of DC subcarrier.

Furthermore, the central frequency of the radio signal transmitted from the radio transmission unit that is adapted to the OFDM/OFDMA system is, for example, 2.5 GHz.

The orthogonal code sequence generating unit 142 generates a code sequence close to "autocorrelation=1" and a "mutual correlation=0" (typically an orthogonal code sequence). The orthogonal code sequence generated in this case is a code sequence equal to the FFT size (FFT=512, 1024, 2048, etc) of the OFDM/OFDMA signal generated by the second transmission processing unit 130. The diffusion code sequence processing units 113-1 to 113-$n$ generate and output C1 to Cn, respectively. In this case, it is assumed that the pilot signal which is a known signal is transmitted by using C1.

Figure 4C:
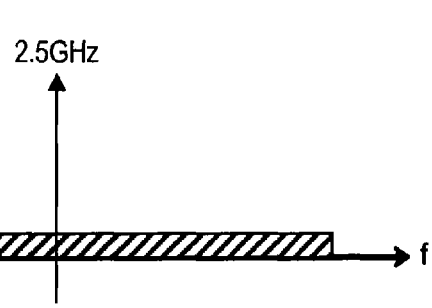

The multiplication unit 143 performs the diffusion processing by multiplying the DC subcarrier data by the orthogonal code sequence. For example, in the diffusion processing, the diffusion processing that is equal to the FFT size is performed, and diffusion rate matches sample rate of the OFDM/OFDMA signal. FIG. 4C illustrates an example of the DC subcarrier data (for example, known pilot signal) obtained after diffusion. In FIG. 4C, horizontal axis is frequency axis, but the diffusion signal C obtained after multiplication is a code sequence in which "0, 1" are actually arranged in time axis direction.

The IFFT unit 132 outputs a sample signal in the time axis direction (subcarrier other than the DC component, or a signal obtained after orthogonal frequency division multiplex processing), similarly to the first embodiment. FIG. 4A illustrates an example of such sample signal. The horizontal axis is taken as the frequency axis, but the sample signal is actuary a data in the time axis direction.

Figure 4D:
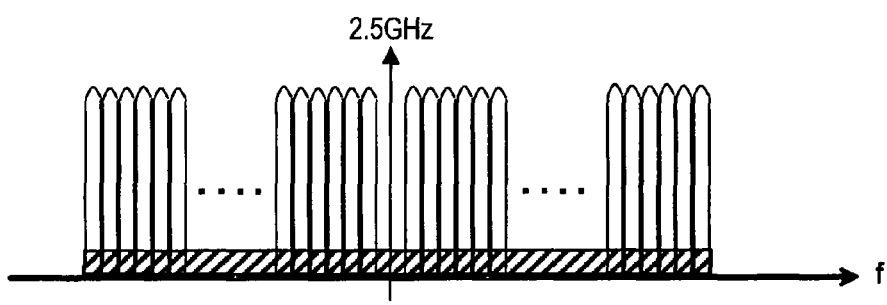

The addition unit 133 adds the DC subcarrier obtained after the diffusion processing (see FIG. 4C) and the sample signal outputted from the FFT unit 132 (subcarrier other than DC; see FIG. 4A). FIG. 4D illustrates an example of signal obtained after the addition. The diffused DC subcarrier and the subcarrier other than the DC component are superimposed and outputted from the addition unit 133. In this figure, the horizontal axis is also taken as the frequency axis, but the signal obtained after the addition is actually a data sequence in the time axis direction.

Furthermore, the DC subcarrier obtained after the diffusion processing is added, in each sample, in synchronous with a first sample of the sample signal, when the DC subcarrier obtained after the diffusion processing is added to the sample signal obtained after IFFT by the addition unit 133. For example, data may be outputted from the data generating unit 141 so as to be added in each sample.

The GI unit 134 inserts the guard interval into the signal obtained after the addition, and the guard interval inserted signal is transmitted from the second transmission antenna 155. Furthermore, the addition unit 133 is provided in the output side of the GI unit 134, and the multiplication unit 143 can add the diffused signal to the GI inserted signal.

In the second embodiment, the CDMA system communication service can be also provided from the first transmission antenna 125 to the terminal 200, and the OFDM/OFDMA system communication service can be provided from the second transmission antennal 155 to the terminal 200. For example, two communication services with different central frequencies can be provided as illustrated in FIG. 5.

Figure 6:
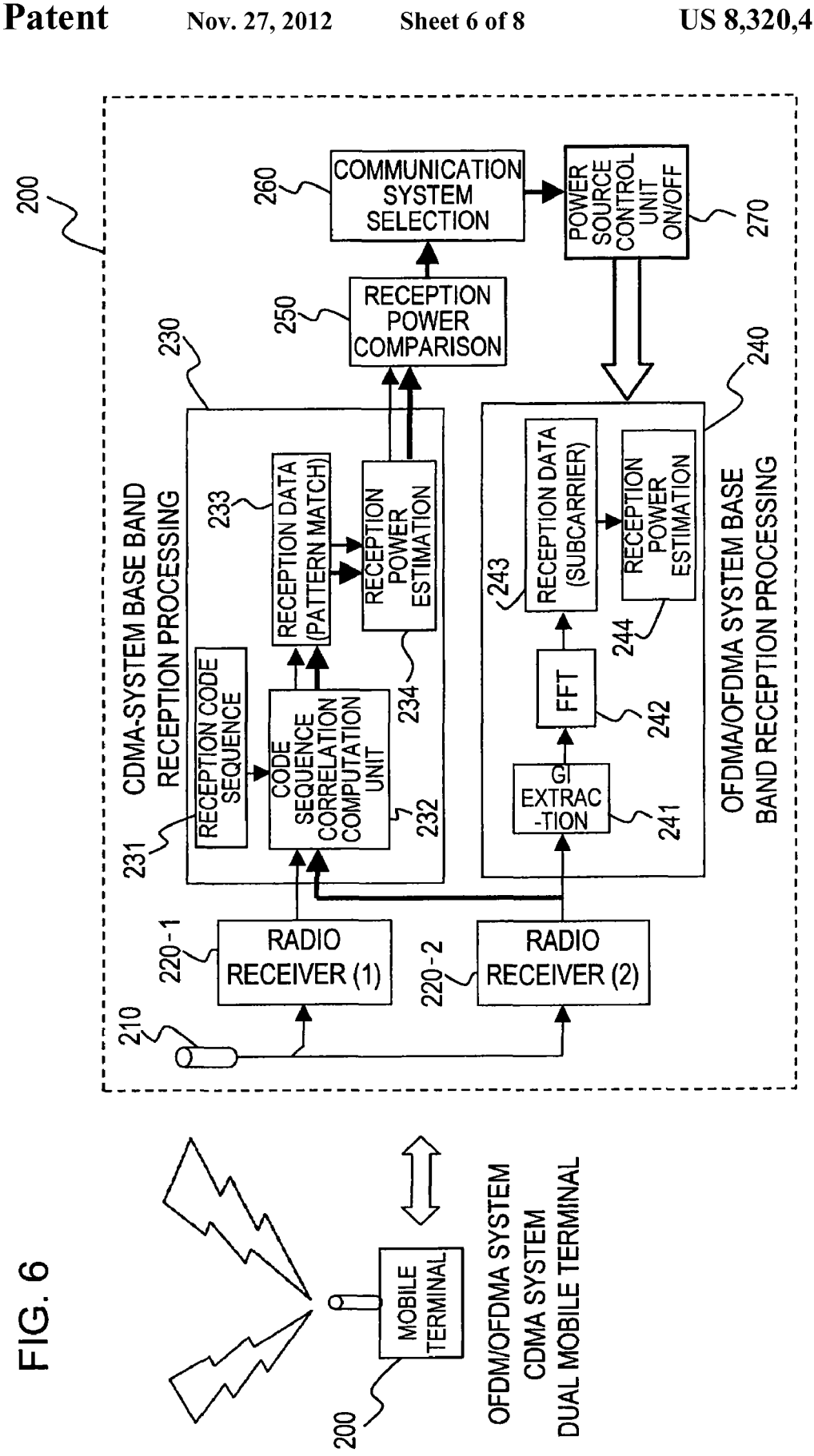
FIG. 6 illustrates a configuration example of a radio reception apparatus.

The radio reception apparatus 200 is explained below. FIG. 6 illustrates a configuration example of the radio reception apparatus 200. This is a more detailed configuration example of the radio reception apparatus 200 illustrated in FIG. 3. Similarly to the first embodiment, the radio communication apparatus 200 includes a reception antenna 210, a first and second radio receiver 220-1, 220-2, a first reception processing unit (CDMA system base band reception processing unit) 230, a second reception processing unit (OFDM/OFDMA system base band reception processing unit) 240, a reception power comparison unit 250, and a communication system selection unit 260.

The radio reception apparatus 200 further includes a power source control unit 270, and the output of the second radio receiver 220-2 is also connected to the first reception processing unit 230.

The second radio reception unit 220-2 outputs the reception signal of OFDM/OFDMA system to the second reception processing unit 240 and first reception processing unit 230. In the first reception processing unit 230, the reception code sequence generating unit 231, the code sequence correlation computation unit 232, and the pattern matching unit 233 (see FIG. 4C) demodulate the diffused DC subcarrier data from among the reception signal of OFDM/OFDMA system. Furthermore, the reception code sequence generating unit 231 may provide the code C identical to that of the orthogonal code sequence 142 to the code sequence correlation computation unit 232, but can provide a signal obtained by adding the GI to the generated signal to the code sequence correlation computation unit 232, in the same manner as in the GI unit 134.

The pattern matching unit 233 performs pattern matching with respect to the reception data obtained after correlation detection which is outputted from the code sequence correlation computation unit 232. For example, the pattern matching unit 233 compares the correlation power value from the code sequence correlation computation unit 232 with a value which is stored in advance, outputs the reception data obtained after correlation detection to the reception power estimation unit 234 when the two match, and makes no output when the two do not match.

The reception power estimation unit 234 estimates power value of the DC subcarrier data and outputs the estimated power value to the reception power comparison unit 250. The reception power comparison unit 250 compares the estimated power value with a threshold, and outputs the result obtained to the communication system selection unit 260. For example, the communication system selection unit 260, determines that the OFDM/OFDMA system reception signal has reception sensitivity better than the CDMA system reception signal (reception power is high) when a result indicating that the estimated power value is equal or higher than the threshold is obtained from the reception power comparison unit 250, and selects the OFDM/OFDMA system communication system. Meanwhile, for example, the communication system selection unit 260 determines that the CDMA system reception signal has better reception sensitivity than the OFDM/OFDMA system reception signal, when a result indicating that the estimated power value is lower than the threshold value is obtained from the reception power comparison unit 250, and selects the CDMA system communication.

Furthermore, it is also possible to compare power estimated by the reception power estimation unit 234 with respect to the code C with power estimated by the reception power estimation unit 234 with respect to the code C1, and select the system corresponding to the higher power (the CDMA system if C1 is larger and OFDM/OFDMA system if C is larger).

As illustrated in FIG. 4D, when the radio reception apparatus 200 receives the OFDM/OFDMA signal with the diffused DC subcarrier, if the reception power of the OFDM/OFDMA power is high, the reception power of the diffused DC subcarrier is also high. And the reception power of the diffused DC subcarrier is estimated by using the inverse diffusion processing based on the CDMA system (code sequence correlation computation unit 232 and pattern matching unit 233) and the reception power estimation (reception power estimation unit 234). Then, in the present embodiment, the level of reception sensitivity of the reception signal of the OFDM/OFDMA system is determined and the communication system is selected by comparing the estimated reception power with the threshold.

The communication system selection unit 260 outputs information of the selected communication system to the power source control unit 270. The power source control unit 270 turns on and actuates the second reception processing unit 240 for the first time, when the OFDM/OFDMA system is selected. Meanwhile, the power source control unit 270 maintains a state in which the second reception processing unit 240 is turned off, when the CDMA system is selected.

The first reception processing unit 230 operates normally in a state with power source turned on, estimates the reception power of the DC subcarrier, and also performs processing with respect to the CDMA system reception signal. The power source control unit 270 maintains the state in which the power source of the second reception processing unit 240 is turned off and causes absolutely no actuation thereof, when the CDMA system is selected (when the reception power of the DC subcarrier is lower than the threshold). The power source control unit 270 turns on the power source of the second reception processing unit 240 for the first time, when the OFDM/OFDMA system is selected (the reception power of the DC subcarrier is equal or higher than the threshold).

Where the first and second reception processing units 230 and 240 are normally actuated, the radio reception apparatus 200 (terminal) consumes the power of both units. However, as described in the second embodiment, because the second reception processing unit 240 is actuated when the reception sensitivity of the OFDM/OFDMA system is good and the power source of the second reception processing unit 240 is turned off when the reception sensitivity is not good, power consumption can be reduced by comparison with the case in which the two reception processing units are actuated.

The radio reception apparatus 200 then performs the processing by using the reception signal of the selected communication system.

In this case, the diffused DC subcarrier data is added after IFFT in the radio transmission apparatus 100 in order not to perform the processing in the FFT unit 242 of the second reception processing unit 240. Where frequency division processing is performed by the IFFT unit 132 to the DC subcarrier data together with the subcarrier data other than DC, the FFT unit 242 of the second reception processing unit 240 may be actuated. In order to ensure the reduction in power consumption, the first reception processing unit 230 of the CDMA system may perform processing directly with respect to the diffused data. For this purpose, the addition unit 133 is provided in the output side of the IFFT unit 132.

Figure 7A:
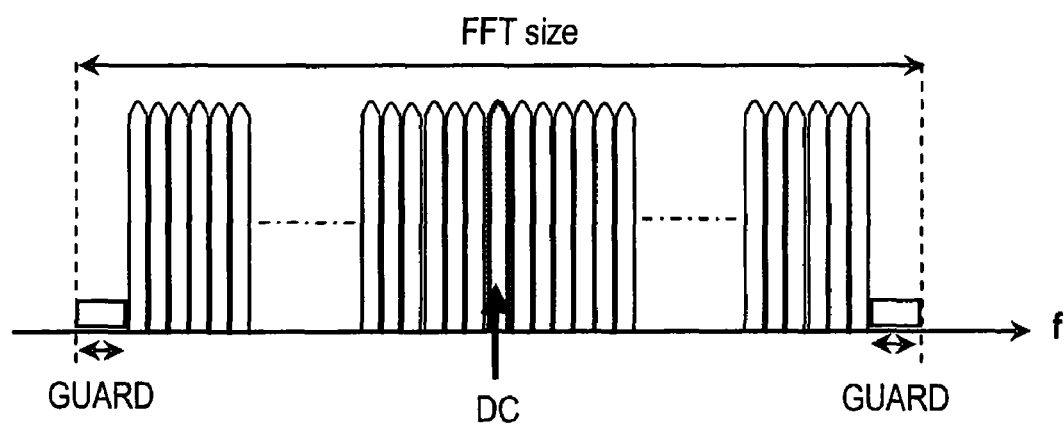
FIG. 7A is an example of subcarrier.

The effective use of frequency band is described below. Thus, in communication using the OFDM/OFDMA system, the DC subcarrier provides an interfering component to all other subcarriers (frequencies). For this reason, data are not allocated to the DC component (see FIG. 7A). The DC subcarrier becomes a non-transmitted carrier as a NULL subcarrier. Therefore, by allocating information to the DC subcarrier, it is possible to ensure a correspondingly more effective use of transmission frequency.

In the present embodiment, for example, control information for compensating a phase shift between the transmission frequency and reception frequency (radio frequency offset error of the transmission and reception apparatuses or phase error amount for individual offset correction), feedback information (ACK signal, NACK signal, or information used for transmission power control), or notification information (identification information inherent to the station or cell number) is allocated in the DC subcarrier. The allocation of this information to the DC subcarrier is performed, for example, in the data generating unit 141.

In the second embodiment, the DC subcarrier is diffused and transmitted to the radio reception apparatus 200, and because the diffusion is made with the orthogonal code sequence with a high diffusion ratio (SF=512, 1024, 2048), the interference in the FFT processing (FFT unit 242) of the radio reception apparatus 200 is at a negligibly low level.

FIG. 7B illustrates examples of subchannel allocation in down link direction (for the base station to the mobile terminal) and up link direction (from the mobile terminal to the mobile station) according to the IEEE802.16 (OFDMA system). The horizontal axis indicates time and the vertical axis indicates frequency in FIG. 7B. A special region ("Ranging subchannel" in FIG. 7B) to shared channel for control information or feedback channel is designated in the subchannel in the up link direction. Therefore, the number of burst regions is reduced and the amount of transmitted user data is decreased. As a result, the effective band of the subcarrier is narrowed and the throughput is reduced.

In the second embodiment, the Ranging information or feedback information that is allocated to the special region is allocated to the DC subcarrier. As a result, the special region can be reduced and the user data region can be accordingly expanded. Therefore, the frequency can be effectively used. This allocation can be also performed by the data generating unit 141.

Other Embodiments

In the above-described first and second embodiments, the code division multiplex processing (CDMA system) and frequency division multiplex system (OFDM/OFDMA system) are explained by way of example as two different communication services. However, it can be also carried out with other aforementioned two communication systems, namely, the GSM system and W-CDMA/CDMA2000 system.

In the above-described first and second embodiments, the radio transmission apparatuses 100, 500 are described as the radio base stations and the radio reception apparatuses 200, 600 are described as the information terminals. It can be also carried out, for example, with the radio transmission apparatuses 100, 500 as the information terminals and radio reception apparatuses 200, 600 as the radio base stations.

The present invention provides a radio transmission apparatus, a radio reception apparatus, a radio transmission and reception system, and methods thereof that reduced power consumption. Further, the present invention provides a radio transmission apparatus that ensures an effective use of a frequency band.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

The invention claimed is:

1. A radio transmission apparatus for transmitting a first radio signal and a second radio signal with different communication system, the apparatus comprising:
a first transmission unit which generates the first radio signal on the basis of a first communication system and transmits the first radio signal;
a diffusion processing unit which performs diffusion processing of data allocated to DC subcarrier on the basis of the first communication system, and generate a diffusion signal;
an addition unit which adds the diffusion signal and a signal obtained by orthogonal frequency division multiplex processing; and
a second transmission unit which transmits the added signal as the second radio signal.

2. The radio transmission apparatus according to claim 1, wherein the diffusion processing unit performs the diffusion processing of same frequency size as a frequency size of the signal obtained by the orthogonal frequency multiplex processing.

3. The radio transmission apparatus according to claim 1, wherein the first communication system is a system based on code division multiplex processing in which an information signal is multiplied by inherent diffusion code sequence.

4. The radio transmission apparatus according to claim 1, further comprising an allocation unit which allocates, to the DC subcarrier, a control information for compensating frequency phase shift, or a feedback information which is transmitted to and received from a radio reception apparatus receiving the first and second radio signal, or a notification information of the wireless receiver, and outputs the allocated signal to the diffusion processing unit.

5. The radio transmission apparatus according to claim 1, further comprising a guard band insertion unit which inserts a guard band into the added signal, wherein
the second transmission unit transmits the guard band inserted signal as the second radio signal.

6. The radio transmission apparatus according to claim 1, wherein the diffusion processing unit generates the diffusion signal by multiplying an information signal allocated to the DC subcarrier by an orthogonal code sequence.

7. A radio reception apparatus for receiving a first radio signal and a second radio signal with different communication system, the apparatus comprising:
a first reception processing unit which generates a first reception data from the first radio signal; and
a second reception processing unit which generates a second reception data from the second radio signal, wherein the first reception processing unit includes a detection unit which inputs the second radio signal, extracts a diffusion signal contained in the second radio signal and diffused on the basis of a first communication system, and detects reception sensitivity of the first and second radio signal on the basis of the diffusion signal to which data allocated to DC subcarrier diffuses.

8. The radio reception apparatus according to claim 7, wherein the detection unit detects the reception sensitivity of the first and second radio signal by estimating reception power of the second radio signal on the basis of the diffusion signal.

9. The radio reception apparatus according to claim 8, wherein the detection unit detects that the second radio signal has reception sensitivity better than that of the first reception signal when the estimated reception power is higher than threshold, and detects that the first radio signal has reception sensitivity better than that of the second radio signal when the estimated reception power is lower than the threshold.

10. The radio reception apparatus according to claim 7, wherein operation of the second reception processing unit is turned ON when the detection unit detects that the second radio signal has reception sensitivity better than that of the first reception signal, and the operation of the second reception processing unit is turned OFF when the detection unit detects that the first radio signal has reception sensitivity better than that of the second radio signal.

11. The radio reception apparatus according to claim 7, wherein the first radio signal is a radio signal obtained by code division multiplex processing in which an information signal is multiplied by an inherent diffusion code sequence in the radio transmission apparatus, the second radio signal is a radio signal obtained by orthogonal frequency multiplex processing of the information signal in the radio transmission apparatus, and the diffusion signal contained in the second radio signal is a radio signal obtained by the code division multiplex processing of the information signal allocated to DC subcarrier.

12. A radio transmission and reception method in a radio transmission and reception system including a radio transmission apparatus for transmitting a first radio signal and a second radio signal with different communication systems, and a radio reception apparatus for receiving the first and second radio signal, the method comprising:
performing diffusion processing of data allocated to DC subcarrier on the basis of the first communication system, and generating a diffusion signal;
adding the diffusion signal and a signal obtained by orthogonal frequency division multiplex processing;
transmitting the added signal as the second radio signal, generating the first radio signal on the basis of the first communication system, and transmitting the first radio signal;
receiving the first and second radio signal;
generating a first reception data from the first radio signal;
generating a second reception data from the second radio signal;
extracting a diffusion signal contained in the second radio signal and diffused on the basis of the first communication system, on the basis of the second radio signal, and detecting reception sensitivity of the first and second reception signal on the basis of the diffusion signal to which allocated to DDC subcarrier diffuses, when the first reception data are generated.

* * * * *